United States Patent Office 3,362,923
Patented Jan. 9, 1968

3,362,923
VINYL HALIDE POLYMERS STABILIZED WITH A METAL SALT OF A CITRIC ACID MONOESTER AND OPTIONALLY ALSO ZINC STEARATE
Charles J. Knuth, Flushing, N.Y., assignor to Chas. Pfizer & Co., Inc., New York, N.Y., a corporation of Delaware
No Drawing. Filed Sept. 24, 1964, Ser. No. 399,067
8 Claims. (Cl. 260—23)

ABSTRACT OF THE DISCLOSURE

A heat and light resistant composition including as a major constituent, a vinyl halide polymer and as a heat and light stabilizer therefor, an effective amount of a neutral metal salt of a citrate monoester containing a cation selected from the group consisting of sodium, potassium, barium, calcium, magnesium, cadmium, zinc, tin and lead ions. The aforesaid composition is a particularly effective heat and light stabilized, non-toxic composition when the cations are sodium, potassium, calcium, magnesium and zinc. Addition of zinc stearate further improves the latter composition.

---

This invention is concerned with the stabilization of vinyl halide polymers against degradation by heat and light. More particularly, it relates to the heat and light stabilized compositions produced thereby and to the usefulness of said compositions in food packaging applications.

Vinyl halide polymers such as the commercially important polyvinyl chloride and its copolymers are markedly subject to degradation when exposed to heat and light. The degradation is evidenced by considerable discoloration which may also be accompanied by the development of brittleness and loss of strength. To eliminate the above said drawbacks, a stabilizer which imparts both heat and light stability must be incorporated into said polymers. Furthermore, when the aforementioned polymers are to be utilized in the manufacture of food wrapping film, surgical tubing, and toys it is of strict importance that stabilizers which are non-toxic in character as well as possessed of significant heat and light stabilizing properties be utilized. It is an object of this invention, therefore, to provide new vinyl halide polymeric compositions which are stabilized against heat and light degradation. A further object of the instant invention is to provide new vinyl halide polymeric compositions which in addition to being stabilized against heat and light, are non-toxic and may, therefore, be utilized in food-packaging applications.

In the embodiment of this invention the term vinyl halide polymers encompasses polymerized vinyl halides and copolymers thereof, such as vinyl chloride copolymers with vinyl esters, acrylic compounds or vinylidene chloride, such copolymers being well known in the art. The preferred vinyl halide polymers include those containing at least 50% by weight of vinyl chloride.

In general, vinyl halide polymer stabilizers are limited in application, i.e., they usually serve either as heat stabilizers or light stabilizers but rarely are possessed or significant heat and light stabilizing properties at the same time. Moreover, more difficult to find is a stabilizer which imparts the above said properties and is also non-toxic. For instance, metal salts of maleate esters are satisfactory stabilizers but are toxic in nature which prohibits their use in food packaging applications.

It has now been found that neutral metal salts of citrate monoesters containing a cation selected from the group consisting of sodium, potassium, barium, calcium, magnesium, cadmium, zinc, tin and lead ions wherein said monoester is selected from the group consisting of alkyl citrate of up to 18 carbon atoms in the alkyl group, alkenyl and alkynyl citrate of up to 10 carbon atoms in the esterifying group, and cycloalkyl citrate of from 3 to 7 carbon atoms in the cycloalkyl group are excellent stabilizers for plastics imparting marked heat and light stability to vinyl halide polymers.

Further, it has been found that neutral metal salts of citrate monoesters containing a cation selected from the group consisting of sodium, potassium, calcuim, magnesium, and zinc ions, wherein said monoester is alkyl citrate of up to 18 carbon atoms in the alkyl group, in additon to providing excellent stabilization with respect to heat and light, can be utilized in the food-packaging field inasmuch as they are non-toxic. Examples of excellent non-toxic stabilizers include: calcium monostearyl citrate, magnesium monooctyl citrate, and potassium monoethyl citrate.

Still further, it has been found that a particularly effective non-toxic stabilizer which imparts excellent heat and light stability is a mixture containing a neutral salt of a citrate monoester containing a cation selected from the group consisting of sodium, potassium, calcium, magnesium, and zinc ions, wherein said monoester is alkyl citrate of up to 18 carbon atoms in the alkyl group and zinc stearate. Suitable compositions containing a metal salt of a citrate monoester and zinc stearate are those in which the weight-ratio of said monoester to zinc stearate is from about 1:1 to about 10:1. More particularly preferred is one in which the weight-ratio of monoester to zinc stearate is from about 3:1 to 8:1.

With reference to the aforementioned neutral metal salts of citrate monoesters, and more specifically to the metal cation M, it should be understood that said cation may be monovalent, for example, sodium, or divalent, for example, calcium. Since the citrate monoester anion carries a valence of −2, it necessarily follows that whereas one divalent cation is required to provide a substantially neutral molecule, two monovalent cations are required to neutralize said charge. Therefore, in those cases where M is divalent, the mole-ratio of citrate anion to cation is 1:1, where as in those cases where M is monovalent, the mole-ratio of citrate anion to cation is 1:2. Examples of the latter type are disodium monostearyl citrate and dipotassium monomethyl citrate.

The metal salts of citric acid monoesters of this invention are prepared using standard methods such as reacting the desired metal carbonate, bicarbonate, acetate, or hydroxide with a citric acid monoester. The metal salts of citric acid monoesters of this invention include the alkali metal such as sodium and potassium, alkaline earth metal such as barium, calcium, and magnesium, cadmium, zinc, lead, and tin.

The monoesters of citric acid which are used in the preparation of the stabilizers of this invention are made from alkanols which contain 1 to 18 carbon atoms, alkenols and alkenols containing up to 10 carbon atoms, and cycloalkanols of from 3 to 7 carbon atoms by methods well known to the art such as reacting citric acid and 1 equivalent of the desired alcohol. The water formed in the esterification reaction is removed by standard procedures, while the reaction mixture is maintained at reflux temperature.

The preferred percentages of the metal salts of citric acid monoesters range from about 1% to about 5% by weight of plastic composition. Larger quantities of stabilizer may be used but no appreciable advantage is realized in so doing. Lesser amounts of the stabilizers, for example, 0.1% by weight, of course, will impart improved stability.

The compositions of the present invention may be produced by mixing the metal salt of citric acid monoesters with the powdered resins for fabricating into the desired product form. For example, in preparing flexible plastic sheets from vinyl chloride polymers such as polyvinyl chloride and the copolymers of vinyl chloride and vinyl acetate, the metal salt of a citric acid monoester is added to the finely powdered resins in percentages ranging from 0.5% to 10% by weight of the vinyl chloride polymers. A suitable plasticizer, for example, dioctyl phthalate, tricresyl phosphate, dioctyl adipate, and others may then be added. The mixture is thoroughly fluxed and mixed until a uniform sheet is obtained.

The stability of the resultant flexible sheets is measured using standard accelerated test procedures well known in the art. For example, a typical accelerated test for light stability comprises exposing a specimen to ultraviolet light as in the Atlas Fadeometer for specific time intervals. The specimens are examined for evidence of breakdown, i.e., the development of discoloration and brittleness. A second accelerated test involves evaluating the heat stabilization of the plastic sheet specimen wherein said specimen is placed in an oven at elevated temperatures ranging from 150° to 180° C. Samples are removed at hourly intervals for a total of 8 hours and inspected for discoloration or other evidence of degradation.

The compounds of this invention considerably retard degradation of the flexible plastic sheets by heat and light. In comparison with specimens containing no stabilizer in the heat stability test, the compounds of this invention impart almost perfect stabilization for periods of at least 3 hours at a temperature of 160° C. Further stabilizing effects are noted at successively longer time intervals although slight discoloration does take place. Generally, only slight discoloration is observed for time periods up to 7 hours, whereas non-treated compositions turned dark brown in a matter of minutes at this elevated temperature. In the light stability test, plastic compositions containing the compounds of this invention showed remarkable stability. In comparison to non-treated compositions which turned very dark brown in 20 hours, the metal salts of citric acid monoesters imparted a minimum light stability to plastic compositions of from 80 to 140 hours.

The following examples are given by way of illustration and are not to be construed as limitations of this invention many variations of which are possible within the scope or spirit thereof.

*Example I*

The monoesters of citric acid are prepared by refluxing a mixture containing one mole of citric acid and 1.1 moles of the selected alcohol until the calculated water is collected. The resulting mixture is water washed, and extracted with a sodium bicarbonate solution. The separated bicarbonate washing is acidified with hydrochloric acid, and extracted with benzene. The benzene solution is evaporated under reduced pressure and the residue, i.e., citric acid monoester, recrystallized from hexane.

*Example II.—Monooctyl citrate*

A mixture containing citric acid (1 M) and n-octanol (1.1 M) is refluxed until slightly more than the calculated amount of water is collected (approx. 18 ml.). The resulting mixture is water washed, and extracted with a sodium bicarbonate solution. The separated bicarbonate washing is acidified with hydrochloric acid, and extracted with benzene. The benzene solution is evaporated under reduced pressure and the product recrystallized from hexane. The yield of product is 24%, M.P. 90–91.6° C.

*Example III.—Calcium monoisopropyl citrate*

To a solution containing isopropyl citrate (23.4 g., 0.1 M) and water (100 ml.) heated on a steam bath, is added calcium carbonate (10 g., 0.1 M). The resulting reaction mixture is allowed to cool to room temperature and the precipitate (product) which forms is filtered and dried in an oven heated to 110° C. The yield of product is 27.2 g., 65%.

Found: C, 35.4%; H, 3.88%; Ca, 17.71%.

*Example IV.—Calcium monostearyl citrate*

To a solution containing calcium acetate (15.8 g., 0.1 M) and water (400 ml.) stirring at room temperature is added monostearyl citrate (44.4 g., 0.1 M) and the resulting mixture heated at 40° C. for 2 hours, and allowed to cool to room temperature. The product is filtered, washed well with water, and dried in a dessicator. The yield of product is 40 g., 83%.

*Analysis.*—Calc'd: C, 59.7%; H, 8.75%; Ca, 8.3%. Found: C, 60.3%; H, 9.19%; Ca, 8.04%.

*Example V.—Barium monooctyl citrate*

To a heated solution of $Ba(OH)_2 \cdot 8H_2O$ (10.5 g., 0.03 M) and water (100 ml.) is added a warm solution of monooctyl citrate (10.1 g., 0.03 M) and water (30 ml.). The product which forms is filtered, washed, and dried in an oven heated to 50° C. The yield of product is 12.5 g., 95%.

*Analysis.*—Calc'd: C, 38.3%; H, 5.0%; Ba, 31.2%. Found: C, 38.4%; H, 5.4%; Ba, 31.0%.

*Example VI.—Cadmium monooctyl citrate*

To a heated solution of monooctyl citrate (10.1 g., 0.03 M) and water (50 ml.) is added a warm solution of cadmium acetate (8.8 g., 0.03 M) and water (50 ml.). The solid product which forms is filtered, washed well with water, and dried to give 9.6 g., 88% yield of product.

*Analysis.*—Calc'd: C, 40.6%; H, 5.32%. Found: C, 39.63%; H, 5.51%.

*Example VII*

The following metal salts of citric acid monoesters are prepared by the procedure of Example III wherein the appropriate reagents, shown below, are used in lieu of isopropyl citrate and calcium carbonate:

Metal salts:
    calcium carbonate
    barium hydroxide
    barium hydroxide
    barium hydroxide
    cadmium acetate
    cadmium acetate
    lead acetate
    lead acetate
    sodium bicarbonate
    potassium bicarbonate
    magnesium carbonate
    magnesium carbonate
    calcium carbonate
    calcium carbonate
    cadmium acetate
    zinc acetate
    tin hydroxide
    sodium bicarbonate Citrate monoester:
    monoethyl citrate
    monostearyl citrate
    monoallyl citrate
    monooctenyl citrate
    monomethyl citrate
    monodecyl citrate
    monoethyl citrate
    monopropenyl citrate
    monooctyl citrate
    monodecenyl citrate
    monocyclopropyl citrate
    monohexenyl citrate
    monocyclohexyl citrate
    monoethynyl citrate
    monocycloheptyl citrate
    monoheptadecyl citrate
    monobutynyl citrate monododecynyl citrate Product:
 calcium monoethyl citrate
 barium monostearyl citrate
 barium monoallyl citrate
 barium monooctenyl citrate
 cadmium monomethyl citrate
 cadmium monodecyl citrate
 lead monoethyl citrate
 lead monopropenyl citrate
 sodium monooctyl citrate
 potassium monodecenyl citrate
 magnesium monocyclopropyl citrate
 magnesium monohexenyl citrate
 calcium monocyclohexyl citrate
 calcium monoethynyl citrate
 cadmium monocycloheptyl citrate
 zinc monoheptadecyl citrate
 tin monobutynyl citrate
 sodium monododecynyl citrate In those instances where the sodium or potassium neutral salts are prepared, since they are water soluble, a freeze-drying step is utilized in order to obtain said products from the water solution.

*Example VIII*

A plastic formulation is prepared by admixing 60 parts of a vinyl chloride polymer, such as a vinyl chloride (95%), vinylacetate (5%) copolymer and 30 parts of a plasticizer, in his case dioctyl phthalate and 0.5 part of a lubricant, stearic acid. To this formulation 0.9 part of the stabilizer is added. The mixture is thoroughly blended by mixing and thereafter fluxed and mixed for 5 minutes and removed in the form of a uniform flexible sheet of 0.025 inch thickness. Test specimens of the flexible sheets are subjected to a heat stability test in the presence of air by placing in an oven maintained at 160° C. Samples were removed hourly for 7 hours and the last sample was removed after 24 hrs. exposure. Samples were arranged in order and compared with a control set containing no stabilizer. Since discoloration occurs gradually over the period of the test it is not practical to report time to first discoloration; therefore each set was classified with respect to overall appearance. Test specimens are also subjected to a light stability test in the Atlas Fadeometer wherein samples were exposed for 20 hr. periods until discoloration or spotting was detected. The results obtained for various metal salts of citric acid monoesters of the instant invention is shown below:

| Stabilizer | Stabilization | |
|---|---|---|
| | Heat (hrs.) | Light (hrs. to discoloration) |
| Barium monoallyl citrate | E-3 | 140 |
| Cadmium monodecyl citrate | E-3 | 140 |
| Cadmium monomethyl citrate | E-3 | 140 |
| Lead monoethyl citrate | G-E 3 | 80 |
| Sodium monooctyl citrate | E-3 | 80 |
| Potassium monodecenyl citrate | E-3 | 80 |
| Barium monooctenyl citrate | E-3 | 140 |
| Calcium monoallyl citrate | G-E 3 | 80 |
| Barium monoallyl citrate | E-3 | 140 |

G=better than control, only slight discoloration; E=no discoloration.

In comparison with a plastic composition containing no stabilizer, improved heat stability is noted. With respect to the light stability test, specimens containing no stabilizer are dark brown at the end of the first hour period; however, test specimens showed no discoloration until after 80 hrs. of exposure.

*Example IX*

The procedure of Example VIII is repeated employing stabilizers cited in Example VII except those already tested in Example VIII, and comparable results are obtained.

*Example X*

The procedure of Example VIII is repeated employing 4.5 g. of a stabilizer cited in Example VII and substantially the same results are obtained.

*Example XI*

The procedure of Example VIII is repeated employing polyvinyl chloride in lieu of the vinyl halide-vinyl acetate copolymer and those stabilizers cited in Example VII and substantially the same results are obtained.

*Example XII*

The procedure of Example VIII is repeated employing a stabilizer containing calcium monostearyl citrate in admixture with zinc stearate, weight-ratio of said citrate to zinc stearate being approximately 4:1, wherein a plastic formulation of the following composition is used in lieu of the vinyl chloride-vinyl acetate copolymer:

| | Parts by weight |
|---|---|
| Polyvinyl chloride | 100 |
| Di(2-ethylhexyl phthalate) | 45 |
| Calcium monostearyl citrate | 0.365 |
| Zinc stearate | 0.086 |
| Epoxidized soybean oil | 5.0 |

Test specimens derived from the above plastic formulation showed excellent heat and light stabilization properties.

The above said procedure is repeated wherein the following weight-ratios of calcium monostearyl to zinc stearate are utilized:

| | Parts by Weight | | Ratio of calcium monostearyl citrate to zinc stearate |
|---|---|---|---|
| | Calcium monostearyl citrate | Zinc stearate | |
| A | 0.860 | 0.086 | 10:1 |
| B | 0.688 | 0.086 | 8:1 |
| C | 0.172 | 0.086 | 2:1 |
| D | 0.086 | 0.086 | 1:1 |

Formulations A, B, C, and D showed excellent heat and light stabilization properties.

*Example XIII*

The procedure of Example XII is repeated employing the stabilizers cited in Example VII in combination with zinc stearate wherein similar weight ratios are used. The polymeric compositions so obtained are effectively stabilized against heat and light degradation.

What is claimed is:

1. A heat and light resistant plastic composition including as a major constituent a vinyl halide polymer and as a stabilizer therefor, an effective amount of a neutral metal salt of a citrate monoester containing a cation selected from the group consisting of sodium, potassium, calcium, magnesium and zinc ions, wherein said monoester is selected from the group consisting of alkyl citrate of up to 18 carbon atoms in the alkyl group, alkenyl and alkynyl citrate of up to 10 carbon atoms in the esterifying group, and cycloalkyl citrate of from 3 to 7 carbon atoms in the cycloalkyl group.

2. A composition as in claim 1 wherein said stabilizer is calcium monoisopropyl citrate.

3. A composition as in claim 1 wherein said stabilizer is calcium monostearyl citrate.

4. A heat and light resistant plastic composition suitable for use in the food-packaging field, comprising as a major constituent a vinyl halide polymer and as a stabilizer therefor, an effective amount of a neutral metal salt of a citrate monoester containing a cation selected from the group consisting of calcium, magnesium, sodium, potassium, and zinc ions, wherein said monoester is alkyl citrate of up to 18 carbon atoms in the alkyl group.

5. A composition as in claim 4 wherein said stabilizer is calcium monostearyl citrate.

6. A heat and light resistant plastic composition suitable for use in the food-packaging field, comprising as a major constituent a vinyl halide polymer and as a stabilizer therefor, an effective amount of a mixture comprising a neutral metal salt of a citrate monoester containing a cation selected from the group consisting of calcium, magnesium, sodium, potassium and zinc ions, wherein said monoester is alkyl citrate of up to 18 carbon atoms in the alkyl group, and the zinc stearate, the weight ratio of said monoester to zinc stearate being from about 1:1 to about 10:1.

7. A heat and light stabilizing composition suitable for use in the stabilization of vinyl halide polymers, said composition comprising a neutral metal salt of a citrate monoester containing a cation selected from the group consisting of calcium, magnesium, sodium, potassium and zinc ions, wherein said monoester is alkyl citrate of up to 18 carbon atoms in the alkyl group, and zinc stearate, the weight ratio of said monoester to zinc stearate in said composition being from about 1:1 to about 10:1.

8. The composition of claim 7 wherein said monoester is calcium monostearyl citrate.

References Cited

UNITED STATES PATENTS

| | | | |
|---|---|---|---|
| 2,446,976 | 8/1948 | Cousins | 260—45.75 |
| 2,507,142 | 5/1950 | Chaban | 260—45.75 |
| 2,564,646 | 8/1951 | Leistner et al. | 260—23 X |
| 2,737,525 | 3/1956 | Mulvaney et al. | 260—481 |
| 2,795,570 | 6/1957 | Fuchs et al. | 260—45.75 |
| 3,231,531 | 1/1966 | Buckley et al. | 260—45.85 |

FOREIGN PATENTS 606,379  10/1960  Canada.

JAMES A. SEIDLECK, *Primary Examiner.*

L. J. BERCOVITZ, *Examiner.*

R. A. WHITE, *Assistant Examiner.*